Figure 1:
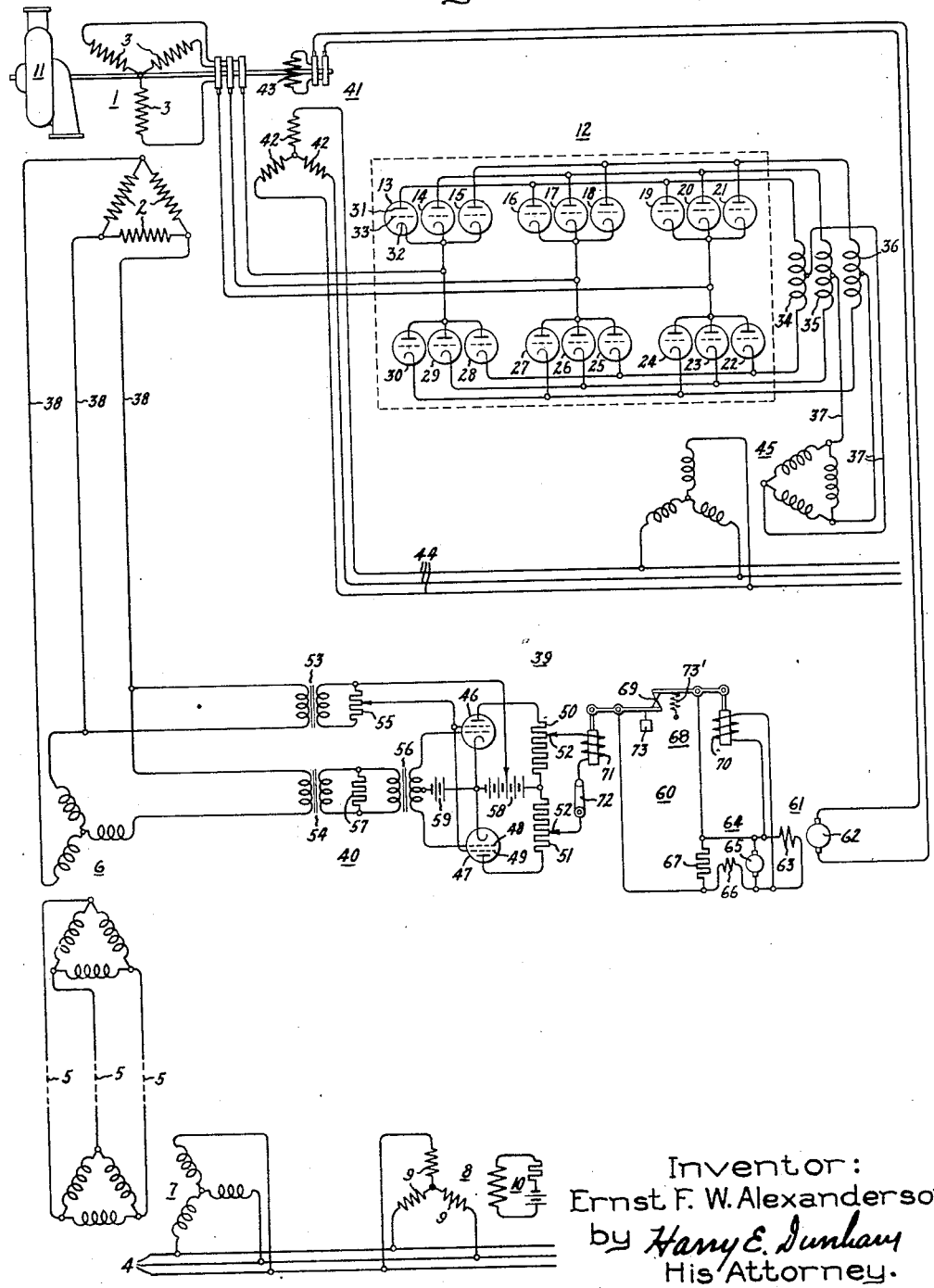

Sept. 10, 1940.   E. F. W. ALEXANDERSON   2,213,945
ELECTRIC POWER TRANSMISSION SYSTEM
Filed Oct. 19, 1937   7 Sheets-Sheet 1

Inventor:
Ernst F. W. Alexanderson,
by Harry E. Dunham
His Attorney.

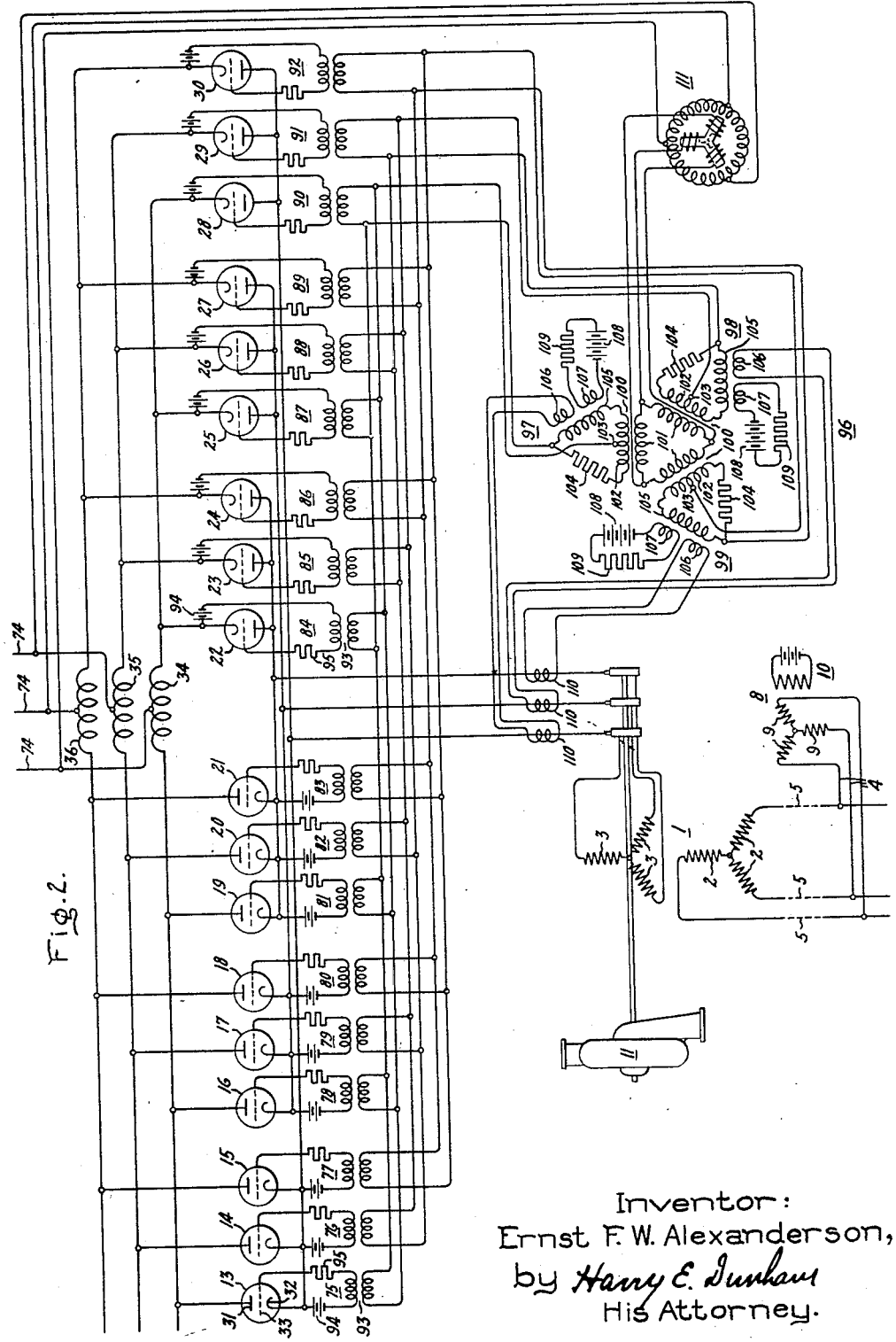

Sept. 10, 1940.  E. F. W. ALEXANDERSON  2,213,945
ELECTRIC POWER TRANSMISSION SYSTEM
Filed Oct. 19, 1937  7 Sheets-Sheet 3
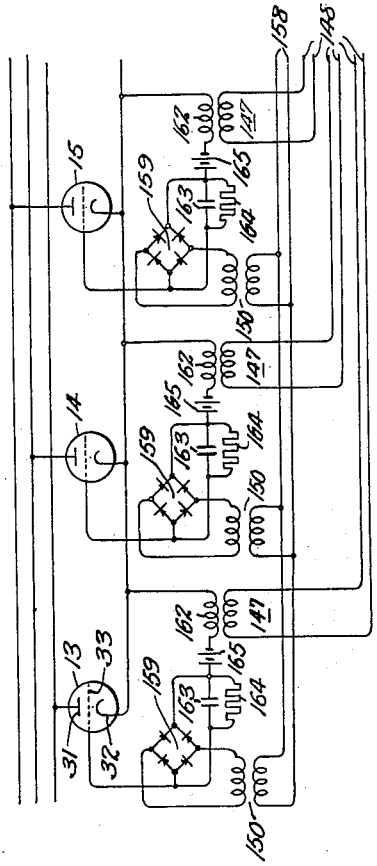
Inventor:
Ernst F. W. Alexanderson,
by Harry E. Dunham
His Attorney.

Sept. 10, 1940.  E. F. W. ALEXANDERSON  2,213,945
ELECTRIC POWER TRANSMISSION SYSTEM
Filed Oct. 19, 1937  7 Sheets-Sheet 5

Inventor:
Ernst F. W. Alexanderson,
by Harry E. Dunham
His Attorney.

Sept. 10, 1940.  E. F. W. ALEXANDERSON  2,213,945
ELECTRIC POWER TRANSMISSION SYSTEM
Filed Oct. 19, 1937  7 Sheets-Sheet 6

Fig.11a.

Inventor:
Ernst F. W. Alexanderson,
by Harry E. Dunham
His Attorney.

Sept. 10, 1940.   E. F. W. ALEXANDERSON   2,213,945
ELECTRIC POWER TRANSMISSION SYSTEM
Filed Oct. 19, 1937   7 Sheets-Sheet 7

Inventor:
Ernst F. W. Alexanderson,
by Harry E. Dunham
His Attorney.

Patented Sept. 10, 1940

2,213,945

UNITED STATES PATENT OFFICE

2,213,945

ELECTRIC POWER TRANSMISSION SYSTEM

Ernst F. W. Alexanderson, Schenectady, N. Y., assignor to General Electric Company, a corporation of New York Application October 19, 1937, Serial No. 169,843

48 Claims. (Cl. 172—237)

My invention relates to electric power systems and more particularly to electric power transmission systems of the alternating current asynchronous type.

With the ever increasing demand for the transmission of electrical power over greater distances and with the coincident requirement for the transmission of larger blocks of power over existing alternating current transmission systems, it has become evident that there is a decided need for improved electric power generation and transmission systems of the type which are not inherently limited by the characteristics of synchronous-to-synchronous transmission. As is well known, in alternating current transmission systems of the synchronous type, the steady state power limit, as well as the transient power limit, are dependent upon the angular displacement between the sending-end voltages and the receiving-end voltages of the systems. In view of the recent importance attributed to a more comprehensive water power development in this country, it has become evident that it is highly desirable to employ asynchronous alternating current transmission systems in order to meet these requirements without sacrificing the desired flexibility of operation and the continuity of service required in large power developments.

As a further consideration, it is important that the departure from the present synchronous systems be made without entailing exorbitant additional expenditures for equipment. An economical changeover from the present systems to asynchronous systems may be effected by installing asynchronous transmitting equipment at the sending stations or by the installation of asynchronous receiving equipment at the receiving ends of existing transmission systems.

Heretofore where induction generators have been employed as the generating unit in asynchronous power transmission systems, the induction generator has not been readily adaptable to asynchronous system requirements, thereby preventing the complete utilization of the inherent advantages of the induction generator. For example, an induction generator with a low resistance squirrel cage winding, while not a synchronous machine, has transient synchronizing characteristics similar in many respects to those of a true synchronous machine due to the flux trapped in the squirrel cage winding. Therefore, the prior art type of induction generator alone is not readily adaptable to asynchronous operation because of its pseudo-synchronous transient characteristics. Furthermore, the prior art induction generators must be associated with synchronous condensers or capacitors to furnish the magnetizing current, and the resultant or overall transient characteristics of such an assembly are so similar to the corresponding characteristics of a synchronous generator that the benefits derived were not great. Since the advent of electric valve converting means and by virtue of the inherent flexibility of control incident thereto, the induction generator controlled and regulated in accordance with my invention may be operated to utilize completely the advantages of asynchronous power generation and transmission.

It is an object of my invention to provide a new and improved electric power transmission system.

It is another object of my invention to provide a new and improved electric power transmission system of the asynchronous type.

It is a further object of my invention to provide a new method for operating alternating current transmission systems of the asynchronous type.

It is a still further object of my invention to provide a new and improved control system for dynamo-electric machines of the induction type.

It is a still further object of my invention to provide a new and improved electric valve control system for induction generators.

It is a still further object of my invention to provide a new and improved control system for alternating current asynchronous power transmission systems.

It is a still further object of my invention to provide a new and improved electric valve frequency changing system.

In accordance with an illustrated embodiment of my invention, I provide a new and improved electric power transmission system of the asynchronous type in which an induction generator supplies electrical energy to a synchronous system through suitable transmission apparatus, and in which the induction generator is controlled by an electric valve means connected in the rotor circuit thereof. The electric valve means controls the voltage and the power output of the induction generator. The induction generator may be operated above or below synchronism, and the electric valve means connected in the rotor circuit may be controlled to supply exciting current to the induction generator, thereby dispensing with the need for auxiliary apparatus such as capacitors or associated synchronous apparatus for supplying exciting current to the generator. The electric valve means connected in the rotor circuit may be energized from a separate alternating current circuit of variable voltage which is employed to control the voltage and the power generated by the induction generator.

In accordance with another feature of my invention, I provide an alternating current transmission system of the asynchronous type which may be employed to interconnect several synchronous systems. According to one arrangement, synchronous alternating current systems may be interconnected by means of a coupled synchronous motor and an asynchronous induction generator. On the other hand, the asynchronous interconnecting link may comprise a synchronous generator and an asynchronous induction motor.

In another embodiment of my invention, I provide a control system including electric valve means for an induction generator in which the electric valve means controls the in-phase component of current in the rotor winding and also establishes therein the exciting current for the induction generator. The control system, by controlling the in-phase component of current in the rotor winding, effects control of the power output of the induction generator, thereby providing a highly satisfactory arrangement for controlling the induction generator under variable load conditions.

According to another feature of my invention, I provide an electric valve control system for controlling an operating condition or an electrical condition of a dynamo-electric machine of the induction type having stator windings and rotor windings. The electric valve means may be connected to the alternating current circuit to which the stator winding is connected or it may be connected to a separate alternating current circuit. The electric valve means are provided with control members which control the conductivities thereof, and excitation circuits energize the control members to control the power interchange between the rotor winding and the alternating current circuit, and hence control an operating condition of the induction machine. As an additional feature, the periodic control voltages which are impressed on the control members are controlled in accordance with the voltage of one of the electric circuits and are shifted in phase in accordance with an electrical condition of the other of the electric circuits. For example, the periodic or alternating voltages impressed on the control members are shifted in phase in accordance with the current of the rotor winding circuit. Suitable phase shifting arrangements are also provided to adjust the phase relation of the voltages impressed on the control members, thereby providing a highly desirable system for controlling the power factor at which power is interchanged between the rotor winding circuit and the alternating current circuits. When the dynamo-electric machine is operating as an induction generator above synchronous speed, the electric valve means may be controlled to supply excitation current to the induction generator thereby dispensing with the need for auxiliary apparatus for supplying exciting current.

In accordance with a still further embodiment of my invention, I provide an electric valve system for operating a dynamo-electric machine of the induction type within a range of speeds extending from sub-synchronous operation to over-synchronous operation. The system includes an alternating current pilot generator which may be direct connected to the rotor of the induction machine for generating an alternating voltage the frequency of which varies in accordance with the speed of the machine. Excitation circuits for the electric valve means supply periodic alternating current voltages for rendering the electric valves conductive in a predetermined order and include means for producing an alternating voltage which varies in accordance with the voltage of an associated alternating current circuit, and means for combining the voltage of the pilot generator thereby to produce a voltage of beat frequency which controls the electric valve means conjointly in accordance with the electrical conditions of the alternating current circuit and the rotor winding of the induction machine. The voltage of beat frequency is modulated in accordance with the voltage of the rotor winding and hence controls the conductivity of the electric valve means to transmit power to or receive power from the rotor winding. The alternating current transferred is of substantially sinusoidal wave form.

In accordance with still further embodiments of my invention, I provide new and improved control or excitation circuits for electric valve means employed in frequency changing systems such as those described above in connection with the transfer of electric power between an alternating current circuit and the rotor winding of a dynamo-electric machine of the induction type.

Figure 5:
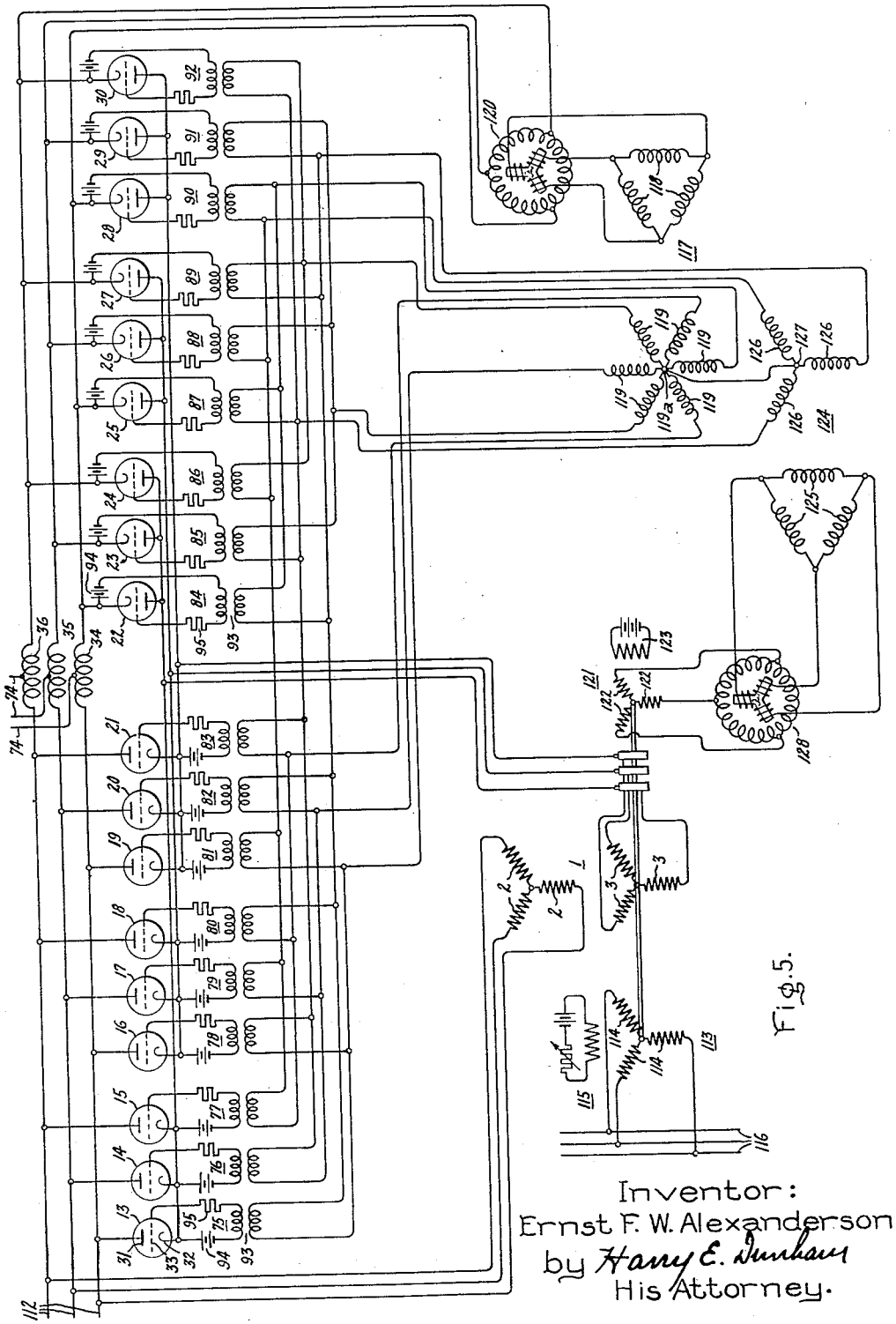
Figure 9:
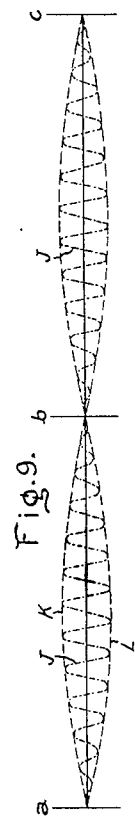
Figure 10:
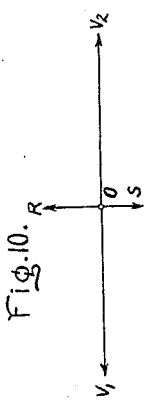
Figure 11B:
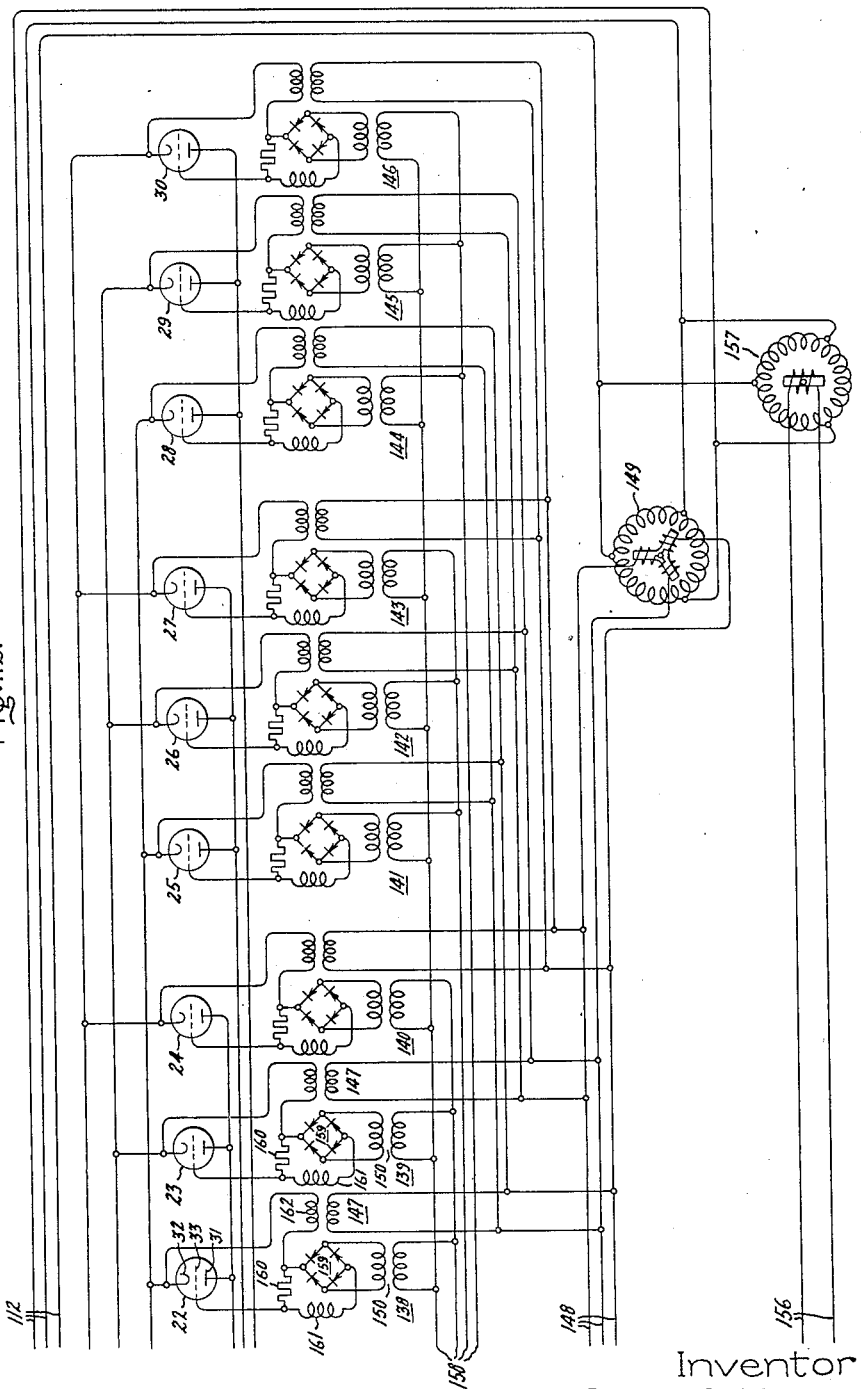

For a better understanding of my invention, reference may be had to the following description taken in connection with the accompanying drawings and its scope will be pointed out in the appended claims. Fig. 1 of the accompanying drawings diagrammatically illustrates an embodiment of my invention as applied to an asynchronous electric power generating and transmission system. Fig. 2 diagrammatically illustrates an embodiment of my invention as applied to an asynchronous electric power generating and transmission system and shows the excitation circuits for electric valve means included in the system, and Figs. 3 and 4 represent certain operating characteristics thereof. Fig. 5 diagrammatically illustrates another embodiment of my invention as applied to an asynchronous electric power transmission system including a dynamo-electric machine of the induction type and associated electric valve means in which the machine is operable as a motor or as a generator within a range of speeds extending from sub-synchronous to over-synchronous operation. Figs. 6-10 represent certain operating characteristics of the embodiment of my invention shown in Fig. 5. Figs. 11a and 11b illustrate a still further embodiment of my invention as applied to an asynchronous electric power transmission system including a dynamo-electric machine of the induction type and including electric valve means for controlling the energization of the machine. Fig. 12 illustrates an excitation or control circuit for electric valve means which may be applied to the systems shown in Figs. 5, 11a–11b.

Referring now to Fig. 1 of the accompanying drawings, I have diagrammatically illustrated my invention as applied to an asynchronous electric power generating and transmission system including an induction generator for generating and transmitting electric power asynchronously. An induction generator 1, including stator or primary windings 2 and rotor or secondary windings 3, is employed to generate electric power asynchronously relative to an associated alternating current circuit 4 which may be connected to the induction generator 1 through a transmission line 5 and suitable transformers 6 and 7. The terms primary and secondary for designating windings 2 and 3, respectively, are employed in accordance with the well known nomenclature established by the induction motor and induction generator arts. This nonmenclature has been adopted in order to facilitate the identification of the windings of an induction machine. Synchronous apparatus, such as a motor or generator 8 having stator windings 9 and a field circuit winding 10, may be connected to the alternating current circuit 4. Rotor winding 3 of induction generator 1 may be driven by any suitable prime mover, such as a steam turbine or waterwheel turbine 11. The induction generator 1, the prime mover 11 and the transformer 6 may be located at the receiving end of the transmission system, and the transmission line 5 may be an electrically long line, that is, a transmission line of a quarter wave length or more in length.

In order to control the voltage and the power generated by the induction generator 1 and to supply excitation current to the induction generator, I employ a mutator, such as the electric valve apparatus 12 including electric valves 13—30. The electric valves 13—30 are preferably of the type employing an ionizable medium such as a gas or a vapor and each includes an anode 31, a cathode 32 and a control member 33. While I have chosen to represent the electric valves 13—30 as being of the type having a single anode and a single cathode enclosed within a receptacle, it is to be understood that I may employ a plurality of rectifying or inverting devices each having a plurality of anodes and a single cathode. The control members 33 of the electric valves 13—30 may be energized by any of the excitation systems described hereinafter in connection with Figs. 2, 3, etc. It will be understood that electric valves 13—21 are oppositely disposed relative to electric valves 22—30 and that these groups of electric valves are interconnected through suitable inductive reactances 34, 35 and 36. The electric valve apparatus including electric valves 13—30 is connected between the rotor winding 3 of induction generator 1 and an alternating current circuit 37 which may be a variable voltage circuit to control the power transmitted to or received from the rotor windings 3 of induction generator 1, and hence to control the power produced by generator 1.

As an arrangement for controlling the voltage and the power supplied by generator 1 in accordance with an electrical condition of generator 1 or in accordance with an electrical condition, such as the power of alternating current circuit 38 which is connected to the stator winding 2 of generator 1, I employ a control circuit 39 which may be of any conventional type. The control circuit 39 may include a circuit 40 for producing an electrical quantity such as a voltage which varies in accordance with the power of circuit 38 or in accordance with the power generated by induction machine 1, and may include a suitable arrangement such as an auxiliary alternating current machine 41 for varying the voltage of circuit 37. The auxiliary alternating current machine 41 may be directly connected to the rotating member of the induction generator 1 and may be arranged to operate as a variable voltage generator when the induction generator 1 is operating below synchronous speed, and may be arranged to operate as a variable voltage motor when the induction generator 1 is operating above synchronous speed. The auxiliary alternating current machine 41 includes armature windings 42, a field winding 43, and the armature windings 42 may be connected to an alternating current circuit 44 which is connected to the circuit 37 through suitable transformers 45. The power responsive and controlling circuit 40 may be of any conventional type and is represented as being of the type described and broadly claimed in U. S. Letters Patent 1,869,209, granted July 26, 1932, on an application of M. S. Mead, Jr., and which is assigned to the assignee of the present application. The circuit 40 includes a pair of electric valves 46 and 47, preferably of the high vacuum type, each having a pair of control members 48 and 49 which control the conductivities of these electric valves conjointly in accordance with the voltage and the current of circuit 38 to produce a voltage across resistances 50 and 51 which varies in accordance with the power of circuit 38. Resistances 50 and 51 may be provided with adjustable contacts 52 for controlling the magnitude of the voltage produced by circuit 40. A transformer 53 impresses on control members 49 of electric valves 46 and 47 a voltage which varies in accordance with the voltage of circuit 38, and a transformer 54 is employed to impress on control members 48 of electric valves 46 and 47 an alternating voltage which varies in accordance with the current of circuit 38. A voltage divider 55 may be connected across the terminals of the transformer 53 to control the magnitude of the voltages impressed on control members 49 and a transformer 56 may be interposed between current transformer 54 and control members 48 to obtain the desired voltage transformation. A suitable impedance element, such as a resistance 57, may be connected across the output terminals of transformer 54 to limit the voltage thereof. A suitable source of unidirectional voltage, such as a battery 58, may be connected between the common juncture of resistances 50 and 51 and cathodes of electric valves 46 and 47, and a suitable negative unidirectional biasing potential may be supplied by a battery 59.

While I have illustrated my invention as comprising a circuit for providing an electrical quantity which varies in accordance with the power of one phase of the circuit 38 or in accordance with the power of one phase of the induction generator 1, it is to be understood that I may employ a circuit in which an electrical quantity proportional to the three phase power is utilized to control the induction generator 1. As an agency for controlling the voltage of circuit 37 and hence as an agency for controlling the power produced by induction generator 1 in accordance with the power of circuit 38, I employ a suitable controlling or regulating circuit 60 which controls the excitation of the field winding 43 of the alternating current machine 41. The regulating system may comprise an exciter 61 having an armature 62 and a field winding 63, a sub-exciter 64 having an armature 65 and a field winding 66, a field regulating resistance 67 for the field 66 of the sub-exciter 64, and a suitable voltage controlling means such as a regulator 68 which may be of the electronic or mechanical type. By way of example, I have shown the regulator 68 as being of the vibratory type which includes a pair of cooperating contacts 69 which intermittently shunt resistance 67, a coil 70 which is responsive to the voltage of the sub-exciter 64 and a coil 71 which is responsive to the output voltage of circuit 40, which voltage varies in accordance with the power of circuit 38. A switch 72 is connected between resistances 50 and 51 and coil 71 to permit the disconnection of the coil 71 from circuit 40. The lower contact 69 of the regulator 68 is balanced by a weight 73 and the upper contact 69 is biased downwardly by a suitable means, such as a spring 73'' which may be connected to the supporting arm for the lower contact 69.

While the control circuit 39 has been shown and described as comprising a particular type of circuit for providing an electrical quantity which varies in accordance with the power of circuit 38 or in accordance with the power generated by induction machine 1, it is to be understood that I may employ any suitable arrangement known in the art. Furthermore, it is to be understood that I may employ any other suitable arrangement for controlling the voltage of circuit 37, and hence the voltage of the generator 1, in accordance with the power of circuit 38 or the power generated by induction generator 1.

The general principles of operation of the embodiment of my invention diagrammatically shown in Fig. 1 will first be considered. Although the induction generator may be driven within a range of speeds extending from sub-synchronous operation to over-synchronous operation and extending through synchronous operation, my invention will be described considering the induction generator operating at a speed above synchronism. Heretofore in the operation of induction generators, the slip frequency of the induction generator has been a relatively small percentage of the stator frequency. When an induction generator is operated under these conditions, although it generates power asynchronously, the induction generator possesses certain pseudo-synchronous transient operating conditions which limit the benefits obtainable by the employment of the induction generator operating at greater slip frequencies. Where the induction generator has a relatively low resistance rotor winding, the field flux trapped in the rotor gives to the induction generator certain pseudo-synchronous transient characteristics which are not desirable. Therefore, I excite the induction generator 1 in a manner to obviate these difficulties and supply to the rotor winding 3 an alternating current of a frequency substantially greater than the natural oscillation frequency of the system including the receiving apparatus, the transmission line and the induction generator. I have found that in a 60 cycle alternating current system satisfactory operation is obtainable by producing in the rotor winding of the induction generator an alternating current of a frequency of approximately 10 cycles. I have also found that when such a ratio or difference of frequencies exists, the induction generator may utilize to its fullest advantage its inherent asynchronous generating characteristics.

Of course, the exciting current for the induction generator 1 may be supplied from synchronous apparatus or capacitors connected to the induction generator or connected to the transmission system. However, in accordance with one embodiment of my invention, namely that shown in Fig. 2 of the accompanying drawings and to be described hereinafter, the electric valve apparatus 13—30 may be employed to supply excitation current to the induction machine 1, thereby reducing to a minimum, the amount of auxiliary exciting apparatus required or even in some instances dispensing altogether with such apparatus.

As will be explained hereinafter in connection with other embodiments of my invention, the electric valve apparatus including electric valves 13—30 may be controlled to control the power produced by induction generator 1 and may be controlled to supply excitation current to the generator 1. As explained hereinafter, this dual control may be effected by control of the periodic or alternating voltages impressed on control members 33 of electric valves 13—30. However, in connection with the explanation of the embodiment of my invention shown in Fig. 1, I have chosen to describe the operation of the system shown therein when the power output of the induction generator 1 is controlled by controlling the magnitude of the alternating voltages impressed on electric valves 13—30. As will be understood, the electric valves 13—30 control the transfer of power between circuit 37 and rotor winding 3. When the induction generator 1 is operating above synchronism, the electric valves 13—30 transfer power from the rotor windings 3 to the auxiliary machine 41 through the alternating current circuit 37, the electric valves operating as a rectifier relative to the voltage of the rotor windings 3 and operating as an inverter relative to the voltage of circuit 37. When the induction motor is operating above synchronism, the auxiliary machine 41 operates as an alternating current motor and assists in driving the rotating member of the induction generator 1. The net or resultant impedance of the rotor winding circuit may be controlled by controlling the magnitude of the voltage of circuit. In addition, the voltage of the induction generator may be controlled by controlling the voltage of circuit 37. When the voltage of circuit 37 is reduced, the net or resultant impedance of the rotor winding circuit is decreased, permitting a greater current to flow in the rotor windings 3 and causing the induction generator 1 to generate a corresponding greater amount of power. On the other hand, when the voltage of circuit 37 is increased, the resultant impedance of the rotor winding circuit is increased effecting thereby a decrease in the rotor winding current and effecting a decrease in the power supplied by generator 1.

Concerning in particular the operation of the control circuit 39, a detailed description of the operation of the circuit 40 may be obtained by referring to the above mentioned Mead patent. Generally speaking, the voltage appearing between the adjustable contacts 52 of resistances 50 and 51 varies in accordance with the true power of circuit 38, or in accordance with the power of induction generator 1. After initial adjustment, the voltage regulating or controlling circuit 60 will respond to regulate the voltage of the alternating current machine 41 in accordance with the power of circuit 38. The engaging contacts 69 serve to short circuit intermittently the resistance 67 which is connected in series relation with field winding 66 of subexciter 64, and thereby control the current supplied to field winding 63 of exciter 61 which in turn controls the excitation of field winding 43 of alternating current machine 41.

In this manner it will be understood that I provide a system which automatically controls the voltage and the power output of an induction generator in accordance with a predetermined controlling influence, such as the power of the system, thereby affording a flexible and reliable arrangement for controlling an induction generator under variable load conditions so that the induction generator may carry a predetermined portion of the load in electric power transmission and generating systems.

Although the above described operation of the arrangement of Fig. 1 is concerned primarily with the operation of the system when the induction generator 1 is driven above synchronous speed, it is to be understood that the system will operate satisfactorily when the induction generator is operating below synchronous speed. When the induction generator is driven below synchronous speed, the alternating current machine 41 in conjunction with the electric valve apparatus 12 supplies power to the rotor windings 3 of induction generator 1 so that the induction generator 1 produces power. Under such conditions of operation, it is necessary that the rotating field produced by the rotor windings 3 revolve in a direction opposite to that produced by the stator windings 2. Since power is transmitted to the rotor windings 3 under this condition of operation, the auxiliary alternating current machine 41 operates as a generator driven by the turbine 11. Where it is desired that the induction generator be susceptible of operating below and above synchronous speed, that is to permit the flow of power in both directions between rotor windings 3 and the auxiliary generator 41, the control members 33 of electric valves 13—30 may be energized by excitation systems of the type shown in Fig. 5.

In Fig. 2 of the accompanying drawings there is diagrammatically shown another embodiment of my invention for controlling a dynamo-electric machine of the induction type. The system shown in Fig. 2 may be employed for generating and transmitting electrical energy asynchronously. The prime mover, the electric valves, the induction generator, the transmission line and associated synchronous apparatus have been assigned reference numerals corresponding to like elements shown in Fig. 1. The rotor windings 3 of the induction generator 1 are energized from a suitable alternating current circuit 74 through the electric valve apparatus including electric valves 13—30 which corresponds to the electric valve apparatus 12 in Fig. 1. It is to be understood that the circuit 74 may be connected to the stator windings 2 where suitable apparatus such as capacitances and synchronous apparatus are available to supply exciting current to the induction generator.

In order to effect transfer of power from the rotor windings 3 to the alternating current circuit 74 conjointly in accordance with different electrical conditions, such as the voltages of the rotor windings 3 and circuit 74, I employ a plurality of excitation circuits 75—92 each of which includes a transformer 93, a suitable source of negative biasing potential such as a battery 94, and a current limiting resistance 95 which is connected in series relation with the associated control member 33. To impress on control members 33 of electric valves 13—30 periodic voltages such as alternating voltages which vary in accordance with the voltage of circuit 74 and in accordance with an electrical condition such as the current or the voltage of rotor windings 3, I provide a control circuit 96 which comprises a plurality of phase shifting circuits 97, 98 and 99. Each of the phase shifting circuits 97—99 may be of the impedance type and may include a transformer 100 having a primary winding 101 and a secondary winding 102 provided with an electrical intermediate connection 103, a resistance 104 and a variable inductance 105 provided with control windings 106 and 107. The variable inductance 105 may be of the saturable type having a magnetic core member, if desired. Control windings 107 may be energized from any suitable source of direct current, such as a battery 108, through a resistance 109, to establish in the variable inductance 105 a component of unidirectional flux. In order to control the phase of the alternating voltages impressed on excitation circuits 75—92 and hence to control the power factor of the current interchange between rotor windings 3 and circuit 74, control windings 106 of phase shifting circuits 97—99 are energized in accordance with an electrical condition of the rotor windings 3, such as the current of these windings. In the arrangement diagrammatically illustrated, control windings 106 are energized in accordance with the current of rotor windings 3 through current transformers 110, thereby shifting the phase of the alternating voltages impressed on control members 33 during each cycle of the rotor winding voltage to control the power factor of the current flowing in the rotor windings 3. Transformers 100 of phase shifting circuits 97—99 may be energized from the alternating current circuit 74 through any suitable phase shifting device such as the rotary phase shifter 111. The phase shifter 111 controls the effective or resultant impedance of the rotor winding circuit of the induction generator 1 and hence permits control of the power produced by the induction generator.

The operation of the embodiment of my invention diagrammatically illustrated in Fig. 2 will be considered when the system is operating to transmit energy to the alternating current circuit 4 and when the induction generator 1 is driven above synchronous speed by the turbine 11. Under this condition of operation, since the induction generator is driven above synchronous speed, power will flow from the rotor windings 3 to the alternating current circuit 74 through electric valves 13—30. The alternating voltages impressed on excitation circuits 75—92 will be controlled to effect this transfer of power conjointly in accordance with the voltage of the rotor windings 3 and the voltage of the circuit 74. Phase shifting circuits 97—99 of the control circuit 96 modulate the phase of the alternating voltages impressed on control members 33 to control the power factor at which power is transmitted to circuit 74 from rotor windings 3. The wave form of the current transferred is substantially sinusoidal. Let is be assumed that the induction generator 1 is driven at a speed so that the rotor winding frequency is approximately 10 per cent that of circuit 74. If the frequency of the alternating current circuit 74 is substantially greater than that of the rotor windings 3, for example, if the frequency of the circuit 74 is 60 cycles and the frequency of the rotor winding current is 6 cycles, power may be transmitted from the rotor windings 3 to circuit 74 and the current may be commutated among electric valves 13—30 in a predetermined order established by excitation circuits 75—92. Under this condition of operation the electric valves 13—30 operate as a rectifier relative to the voltage of rotor windings 3, and operate as an inverter relative to the voltage of circuit 74. Since control windings 106 of phase shifting circuits 97—99 are energized in accordance with the current of rotor windings 3, the phase of the alternating voltages impressed on excitation circuits 75—92 is controlled during each cycle of voltage of the rotor winding circuit, thereby controlling the conductivities of the electric valves 13—30 during each cycle of the rotor winding voltage. By the proper adjustment of the rotary phase shifter 111 and by the proper arrangement of windings 106 and 107 to control the impedance of inductance 105, the conductivities of electric valves 13—30 are controlled so that a leading current is established in rotor windings 3. The variable inductances 105 in the phase shifting circuits 97—99 may be of the saturable type and may be arranged so that winding 107 effects substantial saturation of the inductances 105 and arranged so that windings 106 control the saturation and hence control the phase shifting during each cycle of voltage of rotor windings 3. In this manner the electric valve system establishes an exciting current in the rotor windings 3 and thereby improves the power factor of the induction generator 1. By the proper adjustment of the rotary phase shifter 111, the electric valve apparatus may be controlled to supply substantially all the exciting current required for the induction generator 1 and thereby dispense with the need for auxiliary apparatus such as synchrouous machines and capacitances for supplying the necessary exciting current for the induction generator.

The operation of the embodiment of my invention shown in Fig. 2 may be better understood by referring to the operating characteristics shown in Figs. 3 and 4. Considering Fig. 3 in particular, the curve A represents the output voltage of an electric valve for different phase displacements between the voltages impressed on the control members 33 and the voltages impressed on the anodes 31. Since electric valves 13—30 are operated as inverters relative to the circuit 74, the phase of the alternating voltages impressed on excitation circuits 75—92 through rotary phase shifter 111 is adjusted to lie within the inverter range of operation. Curves B, C and D of Fig. 4 represent the three phase voltages of circuit 74 and curve E represents one phase of the alternating voltage of rotor windings 3 when the ratio between the frequency of circuit 74 and the frequency of rotor windings 3 is substantially 7:1. The heavy curve F represents the opposing voltage in one phase offered by the electric valves 13—30 to the flow of rotor winding current. It is understood that by controlling the wave shape of the opposing voltage F the wave form of the current transmitted to the circuit 74 by rotor windings 3 may be controlled and hence the power factor of the power interchange may also be controlled. For the conditions of operation shown by the curves of Fig. 4, the current transmitted to circuit 74 from rotor windings 3 will occur at substantially unity power factor. If the phase shifting circuits 97—99 are adjusted so that the phases of the alternating voltages impressed on control members 33 are advanced during the fore part of each cycle of rotor winding voltage and retarded during the latter part, the opposing voltage offered by the electric valves 13—30 will be decreased and increased during the respective portions of the wave, and hence the current in the rotor windings 3 will be leading, in this manner effecting an improvement in the power factor at which the induction generator 1 operates and also supplying excitation current to the induction generator 1. It is to be understood that the amount of phase shift of the alternating voltages impressed on control members 33 during each cycle of voltage of the rotor windings 3 may be controlled by the proper proportioning of the phase shifting circuits 97—99.

Although the system diagrammatically shown in Fig. 2 has been explained for operation as an electric power generating and transmitting system for operation of an induction generator above synchronous speed, it is to be understood that the system will also operate as a motor controlling arrangement for an induction motor when in operation below synchronous speed. Under this condition of operation, the electric valves 13—30 and the associated control equipment also permit control of the power factor of the induction machine 1.

In Fig. 5 there is shown another embodiment of my invention for controlling a dynamo-electric machine of the induction type to permit operation of the machine either as an induction motor or as an induction generator above or below synchronous speed. The control system is shown as applied to an asynchronous electric power generator and transmission system. Elements of the arrangement of Fig. 5 have been assigned reference numerals corresponding to similar elements in Figs. 1 and 2. Stator windings 2 of induction generator 1 are connected to an alternating current circuit 112 and the rotating member of the induction generator 1 may be mechanically coupled to a synchronous dynamo-electric machine 113 having armature windings 114 and a field winding circuit 115 to permit asynchronous transfer of power between the alternating current circuit 112 and an alternating current circuit 116. Depending upon direction of power transfer between circuits 112 and 116, the dynamo-electric machine 113 may operate either as a synchronous motor or as a synchronous generator. Of course, under corresponding conditions the induction machine 1 will operate either as an induction generator or an induction motor. It is to be undertsood that circuit 74 may be connected to the alternating current circuit 112 if desired.

As an agency for controlling the conductivities of electric valves 13—30 in accordance with an electrical condition or operating condition of the induction machine 1 and in accordance with the voltage of alternating current circuit 112 or alternating current circuit 74, I provide a control or excitation system for energizing excitation circuits 75—92 to impress on control members 33 periodic or alternating voltages to render the electric valves conductive in a predetermined order and at proper times during the cyclic variations of voltage of the rotor windings 3, and at proper times during the cycles of voltage of circuit 74 or circuit 112. To impress on excitation circuits 75—92 a component of voltage such as an alternating component of voltage which varies in accordance with the voltage of circuit 74 or in accordance with the voltage of circuit 112, I provide a transformer 117 having primary windings 118 and secondary windings 119 which are provided with an electrical neutral connection 119a. A suitable phase shifting arrangement, such as a rotary phase shifter 120, may be employed to control the phase of this component of voltage impressed on the excitation circuits and hence control the energy component of current in rotor windings 3. In order to obtain an electrical quantity, such as an alternating voltage which varies in accordance with an operating condition such as the speed of the induction machine 1, I provide an auxiliary or pilot alternating current generator 121 which may be mechanically connected to the rotating member of the induction machine 1. The pilot generator 121 comprises armature windings 122 and a field winding circuit 123. Due to the fact that the pilot generator 121 is directly connected to the induction machine 1, the frequency of the output voltage thereof will vary in accordance with the speed of the machine 1 and the voltage produced by the pilot generator 1 is introduced in the excitation circuits 75—92 through a transformer 124 and transformer 117. The transformer 124 includes primary windings 125 and secondary windings 126 which are connected to provide a neutral connection 127. Neutral connection 119a of the transformer 117 is connected to the neutral connection 127 of transformer 124 so that the voltage components provided by these transformers act in series relation and impress on excitation circuits 75—92, and hence impress on the associated control members 33, alternating voltages of beat frequency. Secondary windings 119 and 126 of transformers 117 and 124, respectively, are connected to excitation circuits 75—92 in a manner to permit the transfer of power in either direction between rotor windings 3 and circuit 74 or 112. Of course, the frequency of the envelope of the beat voltage is at all times equal to the slip frequency of the induction machine 1, or, in other words, equal to the frequency of the current in rotor windings 3. A suitable phase shifting arrangement such as a rotary phase shifter 128 may be interposed between the pilot generator 121 and the transformer 124 to control the phase displacement between the components of voltage provided by transformer 117 and transformer 124 and thereby control the power factor of the current in rotor windings 3.

The general principles of operation of the embodiment of my invention shown in Fig. 5 will be explained by considering the system thereof when power is being transmitted between alternating current circuits 112 and 116. If it be assumed that the power is transferred from circuit 112 to circuit 116, the machine 1, of course, operates as an induction motor and the machine 113 operates as a synchronous generator. Due to the fact that the machine 1 is of the induction type, power may be transmitted asynchronously between circuits 112 and 116. The control system for the electric valves 13—30 controls the conductivities of these valves to effect energization of the rotor windings 3 irrespective of the angular position of these windings relative to the voltage of the alternating current circuit 112 and hence removes the inherent limitations of synchronous-to-synchronous transmission.

For example, if it is desired to transmit power asynchronously from circuit 112 to circuit 116, the system may be arranged so that the induction machine 1 operates as a motor and the machine 113 operates as a generator. If it be assumed that the circuit 112 operates at 60 cycles and that the alternating current circuit 116 operates at 25 cycles, the synchronous machine 113 may be designed to have six poles and arranged to operate at 500 R. P. M. Under these conditions, the induction machine 1 may be designed to have sixteen poles and arranged to operate at 500 R. P. M. The induction machine 1, therefore, must be operated above synchronism and energy must be supplied to the rotor windings 3 from circuit 112 or circuit 74 through the electric valves 13—30, and the electric valves in conjunction with the associated control circuit must establish alternating current in the rotor windings 3 at a frequency of six cycles. In this manner power will be transmitted from circuit 112 to circuit 116 asynchronously, thereby obviating the limitations of synchronous-to-synchronous transmission.

Considering in particular the operation of the arrangement of Fig. 5, the resultant control voltage impressed on excitation circuits 75—92 is of a beat frequency established by the difference of the alternating component produced by transformer 117 and the alternating component produced by the auxiliary or pilot generator 121.

Figure 6:
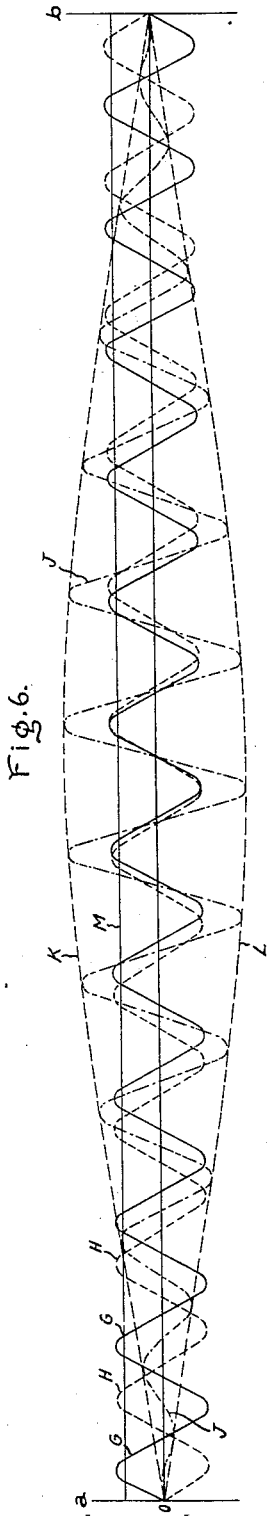

Referring to the operating characteristics shown in Fig. 6, for operation above synchronous speed of the circuit 112 curve G represents the output voltage of the pilot generator 121; the curve H represents the component of voltage introduced in the excitation circuits by transformer 117 and which is derived from circuit 112 or circuit 74; and curve J represents the difference voltage or the beat frequency voltage obtained by subtracting the voltages represented by curves G and H. Of course, the beat frequency voltage as represented by curve J is the resultant voltage impressed on excitation circuits 75—92. The envelopes K and L of the beat frequency voltage J describe an alternating voltage of a frequency corresponding to the frequency of the voltage or current of rotor windings 3. The envelopes K and L of the beat frequency voltage J describe an alternating voltage of a frequency corresponding to the frequency of the voltage or current of rotor windings 3. The envelopes K and L are of the shape of intersecting sine waves and having rounded maxima and sharp minima, and the portions of the envelopes K and L lying between the vertical lines $a$ and $b$ represent one complete cycle of voltage of one phase of the rotor windings 3. Line M represents the negative biasing voltage which is impressed on control members 33 by batteries 94 and establishes the intervals during the cycles of voltage of circuits 74 or 112 at which the electric valves 13—30 are rendered conductive. In other words, the beat frequency voltage, as represented by curve J, is required to exceed the biasing potential in order to render the electric valves conductive.

Figures 7, 8:
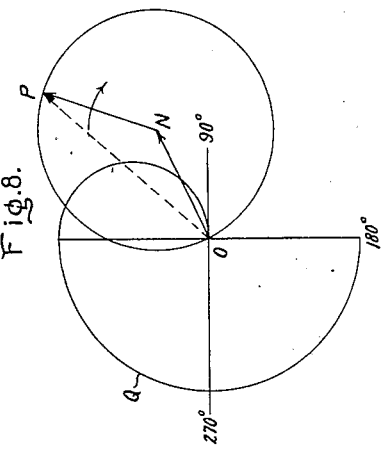

Vector ON of Fig. 7 represents one component of voltage introduced in the excitation circuits by transformer 117 and vector NP represents another component of voltage introduced in the excitation circuits by the pilot generator 121 through transformer 124. The resultant voltage OP is impressed on the control members 33 through excitation circuits 75—92 and, of course, corresponds to the beat frequency voltage represented by curve J of Fig. 6. Curve Q represents the polar diagram of the average power or average conductivity of a valve of the vapor electric discharge type with respect to the phase displacement between the anode and control member voltages. When the induction machine 1 is operating above synchronous speed, the voltage as represented by vector NP rotates in a counterclockwise direction, as indicated by the arrow, and when the induction machine 1 is operating below synchronous speed the vector NP rotates in the clockwise direction, as represented by the arrow in Fig. 8.

For the conditions of operation shown by the curves of Fig. 6, the machine 1 is operating above synchronism at a speed relative to the synchronous speed as established by circuit 112 in a ratio of 60:55. Fig. 9 represents two cycles of voltage of the rotor windings 3 of machine 1; the distance between the vertical lines $a$ and $b$ representing one cycle and the distance between the vertical lines $b$ and $c$ representing another cycle.

When the induction machine 1 is operating below the synchronous speed established by circuit 112, the curve G of Fig. 6 represents the voltage of circuit 112 and the component of voltage introduced in excitation circuits 75—92 by transformer 117. Curve H of Fig. 6 under this condition of operation represents the component of voltage introduced in the excitation circuits by the pilot generator 121. For operation below synchronous speed either as a motor or a generator, the control system in Fig. 5 effects an improvement in the power factor of the current transmitted between rotor windings 3 and circuit 74 or circuit 112 and thereby improves the power factor at which the induction machine 1 operates. This effect will be apparent by consideration of the operating characteristics shown in Fig. 6, since the resultant voltage impressed on the control members 33, as represented by curve J, renders the electric valves fully conductive during the fore part of the voltage waves of the rotor windings 3 and decreases the conductivities of these valves near the latter part of the rotor winding voltage waves, thereby causing the effective rotor current to lead the rotor winding voltages. The wave form of the rotor current is substantially sinusoidal.

The manner in which the power factor of the machine 1 is improved for operation below synchronous speed will be readily understood by consideration of the vectors shown in Fig. 10, where the vector $OV_1$ represents the voltage of one phase of the stator windings 2 and the vector $OV_2$ represents the voltage of the corresponding rotor phase. Vector OR represents the lagging component of current present in the stator windings 2 and includes the magnetizing current. Vector OS represents the leading current present in the rotor windings 3 referred to the primary or stator windings 2. Since the currents as represented by the vectors OR and OS, both referred to the stator windings 2, are in opposition, it is to be understood that the resultant quadrature lagging current of the stator windings 2 will be reduced in magnitude and therefore effect an improvement in power factor.

The energy component of current in the rotor windings 3 may be controlled by adjustment of the rotary phase shifter 120 which controls the phase of the control voltages impressed on control members 33 relative to the voltages of alternating current circuits 74 or 112. By virtue of this phase shifting arrangement, the energy transferred between circuits 112 and 116 may be controlled. Rotary phase shifter 128 may be adjusted to control the phase relation between the alternating current components produced by transformer 117 and pilot generator 121. By suitable adjustment of the rotary phase shifter 128, the power factor of the current in rotor windings 3 may be controlled, thereby providing an expedient arrangement for controlling the quadrature or reactive component of power transmitted between circuits 112 and 116.

Another important feature of the embodiment of my invention shown in Fig. 5 is the feature of the control system which permits operation of the induction motor 1 through synchronous speed. Since the pilot generator 121 supplies voltage at synchronous speed and since the voltage introduced in the excitation circuits by transformer 117 is available at all times, the resultant voltage impressed on the excitation circuits is of suitable value to control the electric valves 13—30 to supply unidirectional current to rotor windings 3 of induction machine 1. The other words, at synchronous speed unidirectional current is transmitted to the rotor windings 3 from circuit 74 or circuit 112 so that the induction machine at synchronous speed operates essentially as a synchronous machine.

Although the operation of the embodiment of my invention shown in Fig. 5 has been explained by considering the system when energy or power is being transmitted from circuit 112 to circuit 116, it is to be understood that the arrangement thereof also is capable of transmitting power or energy from circuit 116 to circuit 112, in which case the synchronous machine 113 operates as a synchronous motor and the induction machine 1 operates as an induction generator.

Referring now to Figs. 11a and 11b conjointly, there is represented another embodiment of my invention as applied to an electric valve translating apparatus for controlling a dynamo-electric machine of the induction type. The elements of Figs. 11a and 11b have been assigned reference numerals corresponding to similar elements in Figs. 1, 2 and 5.

I provide a plurality of excitation circuits 129—146 associated with electric valves 13—30, respectively. I have found that precise and reliable control of the electric valves 13—30 may be obtained by rectifying the beat frequency voltage derived from the pilot generator 121 and the component of voltage derived from circuit 112 through transformer 151. More particularly, I have found that since the envelope of the beat frequency voltage has rounded maxima and peaked minima, precise control may be effected by utilizing the rectified beat frequency voltage as a biasing voltage to maintain the electric valves non-conductive except at the times of occurrence of the peaked or sharp minima. Excitation circuits 129—146 are arranged to utilize this principle. Each of the excitation circuits 129—146 includes a transformer 147 which is energized from the alternating current circuit 112 through conductors 148 and through a suitable phase shifting arrangement such as a rotary phase shifter 149. The voltages impressed on control members 33 by means of transformers 147 is, of course, of a frequency corresponding to that of circuit 112. It is to be understood that instead of energizing the transformers 147 from circuit 112, the transformers may be energized from any other suitable source of alternating current of proper phase and frequency. Each of the excitation circuits 129—146 also includes a transformer 150 which introduces in the excitation circuits an alternating voltage which varies in accordance with the beat frequency voltage produced by the pilot generator 121 and a component of voltage derived from the alternating current circuit 112 through transformer 151 which is provided with a primary winding 152 and secondary windings 153 and 154 having a neutral connection 155. Primary winding 152 of transformer 151 may be connected to the alternating current circuit 112 through conductors 156 and through a suitable phase shifting device such as a rotary phase shifter 157. The resultant voltages produced by the pilot generator 121 and the transformer 151 are impressed on transformers 150 in excitation circuits 129—146 through conductors 158. It will be noted since the groups of electric valves, such as electric valves 13—15, 16—18, and 19—21 are controlled by transformers 124 and 151 so that each group acts as a three phase rectifier relative to the circuit 112 to supply current to rotor windings 3, and that the groups of electric valves 22—24, 25—27, and 28—30 serve to return the current to circuit 112. The valves in each group are rendered conductive simultaneously relative to the voltages of circuit 112 due to the single phase transformer 151 in the control system. Each of the excitation circuits 129—146 is also provided with a rectifier 159 which may be of the full wave type if desired, and which rectifies the beat frequency voltage introduced in the excitation circuits by transformers 150. The output current of the rectifiers 159 is transmitted through a suitable impedance element such as a resistance 160 and an inductance 161 to produce across the terminals of resistance 160 a unidirectional biasing voltage which varies in accordance with the beat frequency voltage and hence in accordance with the voltage or current of the rotor windings 3 of induction machine 1. Resistances 160 are connected in series relation with secondary windings 162 of transformers 147 and the resultant voltage is impressed on the control members 33 of electric valves 13—30.

The general principles of operation of the embodiment of my invention shown in Figs. 11a and 11b are essentially the same as those explained in connection with the embodiment of my invention shown in Fig. 5. The excitation circuits 129—146 operate in a different manner than the excitationo circuits of Fig. 5 and the operation of the former circuits will be considered in detail. If it be assumed that the induction machine 1 is driven by the turbine 11 below the synchronous speed established by circuit 112, in order for the machine 1 to operate as a generator power must be transmitted to the rotor windings 3 through the electric valves 13—30. Furthermore, let it be assumed that suitable auxiliary apparatus, such as capacitances or synchronous apparatus, are connected to the circuit 112 to supply excitation current to machine 1. Under this condition of operation when power is being transmitted to the rotor windings 3, the electric valves 13—30 operate as an inverter relative to the rotor windings 3 and the electric valves 13—30 are rendered conductive in a predetermined order by the excitation circuits 129—146. Transformers 150 and the associated rectifiers 159 introduce in the excitation circuits a variable negative unidirectional biasing potential which varies in accordance with the beat frequency voltage established by the pilot generator 121 and transformer 151. By an inspection of curves K and L of Fig. 6, it is understood that the envelope of the beat frequency voltage J is of the type having rounded maxima and sharp minima. At the points of sharp minima the voltages appearing across the terminals of resistances 160 decreases rapidly and permits the voltages introduced in the excitation circuits by the associated transformers 147 to render the electric valves conductive. Transformers 147 in the excitation circuits introduce positive voltages for rendering the electric valves conductive at predetermined times establishd by the relative phase displacement of the voltages impressed on transformers 150 and transformers 147. The adjustment of these components of alternating voltage may be obtained by the proper positioning of rotary phase shifters 128 and 157. Electric valves 13—30 are rendered conductive when the negative unidirectional biasing potentials produced by transformers 150 and rectifiers 159 decrease to values sufficiently small to permit the voltage produced by transformers 147 to render the electric valves conductive. In this way it is understood that power is transmitted from circuit 112 to rotor windings 3 conjointly in accordance with the voltage of circuit 112 and in accordance with the voltage and frequency of the rotor phase windings 3.

While the operation of the embodiment of my invention shown in Figs. 11a and 11b has been explained when the machine 1 is operating as an induction generator below synchronism, it is to be understood that the arrangement of Figs. 11a and 11b will also operate satisfactorily when the machine 1 is operated as a motor above synchronous speed, in which case power is still transmitted to the rotor windings 3 from the circuit 112 through electric valves 13—30.

In Fig. 12 of the accompanying drawings there is shown another modification of one feature of the embodiment of my invention shown in Figs. 11a and 11b and in which excitation circuits for the electric valves operate in accordance with the minima voltage of the beat frequency voltage. The elements of the excitation circuits in Fig. 12 have been assigned reference numerals corresponding to similar elements in Figs. 11a and 11b. In order to establish a negative unidirectional biasing potential which varies in accordance with the envelope of the beat frequency voltage, as represented by curves K and L of Fig. 6, I provide a capacitance 163 which is connected in series relation with the output voltage of rectifier 159 and which is energized in accordance with the beat frequency voltage through transformer 150. A suitable impedance such as a resistance 164 may be connected across the capacitance 163 to discharge the capacitance at a predetermined rate dependent upon the constants of the circuit and the relative frequencies of the supply circuit and the rotor winding circuit. Rectifier 159 is connected to capacitance 163 to establish thereon a charge which varies in accordance with the envelope of the beat voltage, and the capacitance 163 is connected to the associated control member 33 to impress thereon a negative biasing voltage. A suitable source of positive voltage such as a battery 165 is connected in series relation with the capacitance 163 and secondary winding 162 of transformer 147 to render the associated electric valve conductive when the biasing voltage decreases to a predetermined value and when the voltage of transformer 147 dictates such action.

I have found that the sharp minima may be utilized to effect precise and reliable control of the associated electric valves and the excitation circuits of Fig. 12 utilize this principle. During the portion of the rounded maxima of curves K and L of Fig. 6 the capacitance 163 is charged so that the capacitance 163 impresses a negative potential on control member 33 of the associated electric valve, maintaining the electric valve nonconductive. In the region of the sharp minima the negative voltage produced by capacitance 163 decreases sharply to a value sufficiently small to permit the positive voltage supplied by battery 165 to render the associated electric valve 13 conductive when the voltage of transformer 147 is of proper polarity. The value of resistance 164 is chosen so that the negative potential follows the envelope of the beat frequency voltage very precisely. Of course, the phase relation of the unidirectional biasing voltage relative to the voltage of the alternating current circuit 112 may be positioned by the adjustment of the rotary phase shifter 149 of Fig. 11b, and the phase position of the voltage introduced in the excitation circuit by transformer 147 may be adjusted by means of the rotary phase shifter 157 of Fig. 11b.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an electric transmission line, synchronous apparatus connected to the receiving end of said transmission line, asynchronous apparatus connected to the transmitting end of said transmission line and including an induction generator having a primary winding and a secondary winding and an electric valve means connected in a circuit for said secondary winding to control the power generated by said induction generator, said electric valve means comprising at least one control member, and means for impressing on said control member a voltage which varies as a resultant of an electrical condition of said transmission line and as an electrical condition of said secondary winding to transmit power asynchronously between said transmission line and said induction generator.

2. In combination, an electric transmission line, synchronous apparatus connected to the receiving end of said transmission line, asynchronous apparatus connected to the transmitting end of said transmission line and including an induction generator having primary and secondary windings, an alternating current circuit and electric valve means connected in a circuit for said secondary winding to control the power produced by said generator and to supply excitation current to said generator, said electric valve means comprising at least one control member, and means for impressing on said control member a voltage which varies as a resultant of an electrical condition of said alternating current circuit and an electrical condition of said secondary winding to transmit power asynchronously between said transmission line and said induction generator.

3. In an asynchronous transmission system, the combination of an electric transmission line, synchronous apparatus connected to the receiving end of said transmission line, and asynchronous apparatus connected to the transmitting end of said line comprising an induction generator having stator and rotor windings, an alternating current circuit, and electric valve means connected between said circuit and said rotor to control the power generated by said generator and to establish an excitattion current in said rotor winding of a frequency greater than the natural oscillation frequency of the system.

4. In an asynchronous electric power system, the combination of an induction generator having relatively movable primary and secondary windings, an alternating current circuit connected to one of the windings, a source of alternating current, electric valve energy conversion means connected between said source and the other of the windings to energize said generator to effect transfer of power to said circuit, said electric valve being provided with a control member, and an excitation circuit connected to said control member comprising means for impressing thereon a voltage which varies as a resultant of an electrical condition of said source and an electrical condition of said other winding to effect the transmission of a variable exciting current to said other winding.

5. In an asynchronous electric power transmission system including a transmission line, a dynamo-electric machine having primary and secondary windings and an electric valve means for controlling one of said windings, the method of operation which comprises rotating said one of said windings and energizing said winding at a frequency greater than the natural oscillation frequency of said system to transmit electric power to said line.

6. In an asynchronous electric power transmission system including a transmission line, a dynamo-electric machine having primary and secondary windings and an electric valve means connected in circuit with the secondary winding, the method of operation which comprises rotating said secondary winding at a speed above synchronism and controlling the conductivity of the electric valve means to establish alternating current in said secondary winding at a frequency greater than the natural oscillation frequency of said system to transmit electric power to said line.

7. In an asynchronous electric power system, the combination of an alternating current circuit, an induction generator having primary and secondary windings, the primary winding being connected to said circuit, means for supplying variable amounts of exciting current to said induction generator, means comprising an electric valve means connected in circuit with the secondary winding to control the power output of said generator, said electric valve means comprising a control member, and an excitation circuit for said control member comprising means for impressing thereon a voltage which varies as a resultant of the voltage of said circuit and an electrical condition of said secondary winding to effect asynchronous transmission of power between said alternating current circuit and said induction generator.

8. In combination, an induction generator having a stator winding and a rotor winding, electric valve means connected to said rotor winding for controlling the resuultant impedance thereof to control the power output of said generator, and means for controlling the voltage of said induction generator.

9. In combination, an alternating current circuit, an induction generator having a stator winding and a rotor winding, said stator winding being connected to said circuit, a second alternating current circuit, an electric valve means connected between said second circuit and said rotor winding for transferring power therebetween, and means for controlling the voltage of said second circuit to control the voltage of said generator and the power generated thereby.

10. In combination, an alternating current circuit, an induction generator having a stator winding and a rotor winding, said stator winding being connected to said circuit, a second alternating current circuit, an electric valve means connected between said second circuit and said rotor winding for transferring power therebetween, and means for controlling the voltage of said second circuit to control the amount of power interchanged between said second circuit and said rotor winding.

11. In combination, an alternating current circuit, a dynamo-electric machine of the induction type having a stator winding and a rotor winding, said stator winding being connected to said circuit, a second alternating current circuit, an electric valve means connected between said second circuit and said rotor winding for controlling the transfer of power therebetween, and means for controlling the voltage of said second circuit in accordance with the power of said first mentioned circuit to control said dynamo-electric machine.

12. In combination, an alternating current circuit, an induction generator having a stator winding and a rotor winding, said stator winding being connected to said circuit, a second alternating current circuit, an electric valve means connected between said rotor winding and said second circuit to transfer power therebetween, and means for controlling the voltage of said second circuit in accordance with the power of said first circuit to effect control of the power produced by said generator.

13. In combination, an induction generator having a stator winding and a rotor winding, an alternating current circuit, an electric valve means connected between said rotor winding and said circuit to transmit power from said rotor winding to said circuit and for controlling the resultant impedance of the rotor winding circuit, and means for controlling the voltage of said alternating current circuit to control the power produced by said generator.

14. In combination, an alternating current circuit, an induction generator having a stator winding connected to said circuit and having a rotor winding, an auxiliary alternating current machine mechanically coupled to said rotor winding, and an electric valve means connected between said rotor winding and said auxiliary machine to control the power output of said induction generator.

15. In combination, an alternating current circuit, an induction generator having a stator winding connected to said circuit and having a rotor winding, an auxiliary alternating current machine mechanically coupled to said rotor winding, an electric valve means connected between said rotor winding and said auxiliary machine for transmitting power therebetween, and means for controlling the conductivity of said electric valve means to control the reactive component of current in said rotor winding.

16. In combination, an alternating current circuit, an induction generator having a stator winding connected to said circuit and having a rotor winding, an auxiliary alternating current machine mechanically coupled to said rotor winding, an electric valve means connected between said rotor winding and said auxiliary machine for transmitting power therebetween, and means for controlling the voltage of said auxiliary machine to control the in-phase component of current in said rotor winding.

17. In combination, an alternating current circuit, a dynamo-electric machine of the induction type having a stator winding connected to said circuit and having a rotor winding, an auxiliary alternating current machine mechanically coupled to said rotor winding, and an electric valve means connected between said rotor winding and said auxiliary machine to control the power output of said dynamo-electric machine.

18. In combination, an alternating current circuit, an induction generator having a stator winding connected to said circuit and having a rotor winding, an auxiliary alternating current machine mechanically coupled to said rotor, and an electric valve means connected between said rotor winding and said machine for transmitting power therebetween, said auxiliary machine being arranged to operate as a motor for operation of said induction generator above synchronous speed and being arranged to operate as a generator for operation of said induction generator below synchronous speed to transmit power to said rotor winding.

19. In combination, an alternating current circuit, a dynamo-electric machine of the induction type having a stator winding connected to said circuit and having a rotor winding, an auxiliary alternating current machine of the synchronous type mechanically coupled to said rotor winding, an electric valve means connected between said rotor winding and said auxiliary machine for transmitting power therebetween, and means for controlling the voltage of said auxiliary machine to control the power output of said dynamo-electric machine.

20. In combination, an alternating current circuit, an induction generator having a stator winding connected to said circuit and having a rotor winding, an auxiliary alternating current machine of the synchronous type mechanically coupled to said rotor winding, said auxiliary machine being provided with a field winding for controlling the voltage thereof, an electric valve means connected between said rotor winding and said machine for transmitting power therebetween, and means for controlling the energization of said field winding in accordance with an electrical condition of said alternating current circuit to control the power output of said induction generator 21. In combination, an alternating current circuit, an induction generator having relatively movable windings, one of said windings being connected to said circuit, means for rotating another of said windings above synchronous speed, and an electric valve means connected to said last mentioned winding to supply excitation current to said generator.

22. In combination, an alternating current circuit, an induction generator having relatively movable windings, one of said windings being connected to said circuit, means for rotating another of said windings above synchronous speed, and an electric valve means connected to said last mentioned winding to control the power supplied by said generator and to supply excitation current to said generator.

23. In combination, an alternating current circuit, an induction generator having a stator winding connected to said circuit and having a rotor winding, means for rotating the latter winding above synchronous speed, a second alternating current circuit, and an electric valve means connected between said second circuit and said rotor winding for controlling the power factor at which power is transmitted from said rotor winding to said second circuit.

24. In combination, an alternating current circuit, an induction generator having stator and rotor windings, an electric valve means connected between the rotor winding and said circuit to transmit power therebetween, and means responsive to the voltage of said circuit and an electrical condition of said rotor winding for controlling said electric valve means to control the power factor of the current interchange between said rotor winding and said circuit.

25. In combination, an alternating current circuit, an induction generator having stator and rotor windings, an electric valve means connected between the rotor winding and said circuit to transmit power therebetween, said electric valve means having control members for controlling the conductivities thereof, and means responsive to the voltage of said circuit and an electrical condition of said rotor winding for impressing on said control members periodic voltages to control the power factor at which power is transmitted between said rotor winding and said circuit.

26. In combination, an alternating current circuit, a dynamo-electric machine of the induction type having a stator winding and a rotor winding, an electric valve means connected between said rotor winding and said circuit to transmit power therebetween, said electric valve means having a control member for controlling the conductivity thereof, and an excitation circuit for energizing said control member comprising means for impressing on said control member a periodic voltage having a frequency equal to that of said alternating current circuit and means for phase modulating said periodic voltage in accordance with an electrical condition of said rotor winding.

27. In combination, an alternating current circuit, a dynamo-electric machine of the induction type having a stator winding and a rotor winding, a plurality of electric valve means connected between said rotor winding and said circuit to transmit power therebetween, said electric valve means having control members for controlling the conductivities thereof, and an excitation circuit for energizing said control members comprising means for impressing on said control members periodic voltages and means for controlling the phase of said periodic voltages relative to the voltage of said alternating current circuit during cycles of voltage of said rotor winding.

28. In combination, an alternating current circuit, a dynamo-electric machine of the induction type having a stator winding and a rotor winding, an electric valve means connected between said rotor winding and said circuit to transmit power therebetween, said electric valve means having a control member for controlling the conductivity thereof, means responsive to the voltage of said circuit and to the current of said rotor winding for impressing on said control member a periodic voltage to control the impedance of the rotor winding circuit, and means for shifting the phase of said periodic voltage in accordance with the rotor current to control the power factor at which power is transmitted between said alternaitng current circuit and said rotor winding.

29. In combination, a synchronous alternating current system, a second synchronous alternating current system, and asynchronous apparatus for inter-connecting said systems comprising a coupled synchronous motor and an induction generator having stator and rotor windings, said motor being connected to one of said systems and said stator winding of said generator being connected to said second system and an electric valve means connected to said rotor winding to control the power generated by said induction generator to transmit power asynchronously between said systems.

30. In an asynchronous electric power transmission system, the combination of an alternating current circuit, a second alternating current circuit, a synchronous alternating current generator connected to said first mentioned circuit, an induction motor having a stator winding and a rotor winding mechanically coupled to said synchronous generator, said stator winding of said induction motor being connected to said second alternating current circuit and means comprising an electric valve means connected between the rotor winding of said motor and said second circuit to control the power generated by said synchronous generator to transmit power asynchronously between said alternating current circuits.

31. In combination, an alternating current circuit, a dynamo-electric machine of the induction type having a stator winding and a rotor winding, an electric valve means connected between said rotor winding and said circuit to transmit power therebetween, said electric valve means having a control member for controlling the conductivity thereof, and an excitation circuit for energizing said control member comprising means for impressing on said control member a periodic voltage having a component which varies in accordance with the voltage of said circuit and a component which varies in accordance with the voltage of said rotor winding.

32. In combination, an alternating current circuit, a dynamo-electric machine of the induction type having a stator winding and a rotor winding, a plurality of electric valve means connected between said rotor winding and said circuit to transmit power therebetween, said electric valve means each having an anode and a control member for controlling the conductivity thereof, and an excitation circuit for energizing the control members to effect transfer of power between said alternating current circuit and said rotor winding conjointly in accordance with the voltage of said alternating current circuit and the voltage of said rotor winding comprising means for impressing on the control members periodic voltages each having a component which varies as the voltage of said circuit and a component which varies as the voltage of said rotor winding for controlling the phase of said periodic voltages relative to the associated anode voltages during cycles of the rotor winding voltage to control the power factor at which power is transmitted between said alternating current circuit and said rotor winding.

33. In combination, an alternating current circuit, a dynamo-electric machine of the induction type having a stator winding connected to said alternating current circuit and having a rotor winding, electric translating apparatus connected between said circuit and said rotor winding for transmitting power therebetween and comprising a plurality of electric valve means each having an anode and a control member for controlling the conductivity thereof, and an excitation system for energizing the control members comprising means for impressing on the control members periodic voltages each having a component which varies in accordance with the voltage of said alternating current circuit and a component which varies in accordance with an electrical condition of said rotor windings and means for controlling the phase of said first mentioned component relative to the anode voltages to control the real component of power transmitted between said alternating current circuit and said rotor winding.

34. In combination, an alternating current circuit, a dynamo-electric machine of the induction type having a stator winding connected to said alternating current circuit and having a rotor winding, electric translating apparatus connected between said circuit and said rotor winding for transmitting power therebetween and comprising a plurality of electric valve means each having an anode and a control member for controlling the conductivity thereof, and an excitation system for energizing the control members comprising means for impressing on the control members periodic voltages each having a component which varies in accordance with the voltage of said alternating current circuit and a component which varies in accordance with an electrical condition of said rotor winding and means for controlling the phase of said second mentioned component of voltage to control the reactive component of power transmitted between said alternating current circuit and said rotor winding.

35. In combination, an alternating current circuit, a dynamo-electric machine of the induction type having a stator winding connected to said alternating current circuit and having a rotor winding, electric translating apparatus connected between said circuit and said rotor winding for transmitting power therebetween and comprising a plurality of electric valve means each having an anode and a control member for controlling the conductivity thereof, and an excitation system for energizing the control members comprising means for impressing on the control members periodic voltages each having a component which varies in accordance with the voltage of said alternating current circuit and a component which varies in accordance with an electrical condition of said rotor winding, means for controlling the phase of said first mentioned component relative to the anode voltages to control the real component of power transmitted between the alternating current circuit and the rotor winding and means for controlling the phase of said second mentioned component of voltage to control the reactive component of power transmitted between said alternating current circuit and said rotor winding.

36. In combination, an alternating current circuit, a second circuit, electric translating apparatus for transmitting power between said circuits and comprising a plurality of electric valve means each having an anode and a control member for controlling the conductivity thereof, and an excitation circuit for energizing the control members comprising means for producing a periodic voltage which varies in accordance with an electrical condition of one of said circuits, means for producing a second periodic voltage the frequency of which varies in accordance with a controlling influence derived from the other of said circuits and means responsive to a periodic voltage of beat frequency produced by said periodic voltages for impressing on the control members control voltages to render said electric valve means conductive in a predetermined order to effect transfer of power between said first mentioned and said second circuits.

37. In combination, an alternating current circuit, a second alternating current circuit, electric translating apparatus for transmitting power between said circuits and comprising a plurality of electric valve means each having an anode and a control member, and a plurality of excitation circuits each associated with a different electric valve means for energizing the control members comprising means for producing a periodic voltage which varies in accordance with an electrical condition of one of said circuits and means for producing a periodic voltage the frequency of which varies in accordance with a controlling influence derived from the other of said circuits, means responsive to a periodic voltage of beat frequency produced by said periodic voltages for impressing control voltages on said control members to render said electric valve means conductive in a predetermined order and means for controlling the phase relation of said first mentioned periodic voltage and said second periodic voltage to control the phase of said periodic voltage of beat frequency.

38. In combination, an alternating current circuit, a second circuit, electric translating apparatus connected between said circuits for effecting the transfer of power therebetween and comprising a plurality of electric valve means each having an anode and a control member, and a plurality of excitation circuits each associated with a different electric valve means and including means for producing a periodic voltage which varies in accordance with the voltage of said first mentioned circuit, means for producing periodic voltages the frequency of which varies in accordance with a controlling influence derived from said second circuit, means for impressing on the associated control members biasing potentials tending to maintain the associated electric valve means nonconductive and means responsive to said periodic voltages for producing resultant beat voltages modulated in accordance with the voltage of said second circuit to control the moments during cycles of associated anode voltages at which the electric valves are rendered conductive.

39. In combination, an alternating current circuit, a dynamo-electric machine of the induction type having a stator winding connected to said circuit and having a rotor winding, a plurality of electric valve means connected between said circuit and said rotor winding for transmitting power therebetween and each comprising an anode and a control member, a plurality of excitation circuits each associated with a different electric valve means and each comprising means for producing a periodic voltage which varies in accordance with the voltage of said alternating current circuit, and means for introducing into said excitation circuits periodic voltages which vary in accordance with the speed of said dynamo-electric machine to produce in said excitation circuits resultant beat voltages, said beat voltages having envelopes which vary in accordance with the voltage of said rotor winding to effect transfer of power between said alternating current circuit and said rotor winding through said electric valve means.

40. In combination, an alternating current circuit, a dynamo-electric machine of the induction type having a stator winding connected to said circuit and having a rotor winding, a plurality of electric valve means connected between said circuit and said rotor winding for transmitting power therebetween and each comprising an anode and a control member, a plurality of excitation circuits each associated with a different electric valve means, and each comprising means for producing a periodic voltage which varies in accordance with the voltage of said alternating current circuit, means for introducing into said excitation circuits periodic voltages which vary in accordance with the speed of said dynamo-electric machine to produce in said excitation circuit resultant beat voltages, said beat voltages having envelopes which vary in accordance with the voltage of said rotor winding to effect the transfer of power between said alternating current circuit and said rotor winding through said electric valve means, and means for controlling the phase of said beat voltages relative to the anode voltages of said electric valve means.

41. In combination, an alternating current circuit, a dynamo-electric machine of the induction type having a stator winding connected to said circuit and having a rotor winding, a plurality of electric valve means connected between said circuit and said rotor winding for transmitting power therebetween for operation above and below synchronism, said electric valve means comprising an anode and a control member for controlling the conductivity thereof, a plurality of excitation circuits each associated with a different electric valve means and each comprising means for producing a periodic voltage which varies in accordance with the voltage of said alternating current circuit, and means for introducing into said excitation circuits periodic voltages which vary in accordance with the speed of said dynamo-electric machine to produce in said excitation circuits resultant beat voltages, said beat voltages being modulated in accordance with the voltage of said rotor winding to render said electric valve means conductive in a predetermined order to effect transfer of power between said alternating current circuit and said rotor winding within a range of operating speeds extending from sub-synchronous operation to over-synchronous operation.

42. In combination, an alternating current circuit, a second alternating current circuit, electric translating apparatus connected between said circuits for effecting the transfer of power therebetween and comprising a plurality of electric valve means each having an anode and a control member, and a plurality of excitation circuits each associted with a different one of said electric valve means and including means for producing a periodic voltage which varies in accordance with the voltage of said first mentioned circuit, means for producing a second periodic voltage which varies in accordance with a controlling influence derived from said second alternating current circuit, means responsive to said first mentioned and said second periodic voltages for producing beat voltages of variable magnitude and being modulated in accordance with the voltage of said second alternating current circuit, means comprising a unidirectional conducting device for rectifying said beat voltages to establish negative unidirectional biasing potentials tending to maintain the associated electric valve means nonconductive, means for producing voltages sufficient to overcome said biasing potential to render said electric valve means conductive and means responsive to a resultant of said last mentioned voltages and said biasing potentials for controlling the moments during cycles of associated anode voltages at which the electric valve means are rendered conductive.

43. In combination, an alternating current circuit, a second alternating current circuit, electric translating apparatus connected between said circuits for effecting the transfer of power therebetween and comprising a plurality of electric valve means each having an anode and a control member, and a plurality of excitation circuits each associated with a different one of said electric valve means and including means for producing a periodic voltage which varies in accordance with the voltage of said first mentioned circuit, means for producing a second periodic voltage the frequency of which varies in accordance with a controlling influence derived from said second alternating current circuit, means responsive to said first mentioned and said second periodic voltages for producing a beat voltage of variable magnitude having an envelope which varies in accordance with the voltage of said second alternating current circuit, means for controlling the phase relation of said first mentioned periodic voltage and said second periodic voltage to control the phase of said beat voltage relative to the anode voltage of the associated electric valve means, means comprising a unidirectional conducting device for rectifying said beat voltage to establish a negative unidirectional biasing potential tending to maintain the associated electric valve means nonconductive and means for producing a voltage sufficient to overcome said biasing potential to render said electric valve means conductive, said control members being energized in accordance with a resultant of said last mentioned voltage and said biasing potential for controlling the moments during cycles of associated anode voltages at which the electric valve means are rendered conductive.

44. In combination, an alternating current circuit, a second alternating current circuit, electric translating apparatus connected between said circuits for effecting the transfer of power therebetween and comprising a plurality of electric valve means each having an anode and a control member, and a plurality of excitation circuits each associated with a different one of said electric valve means and including means for producing a periodic voltage which varies in accordance with the voltage of said first mentioned circuit, means for producing a second periodic voltage the frequency of which varies in accordance with a controlling influence derived from said second alternating current circuit, means responsive to said first mentioned and said second periodic voltages for producing a beat voltage of variable magnitude modulated in accordance with the voltage of said second alternating current circuit, means for controlling the phase relation of said first mentioned periodic voltage and said second periodic voltage to control the phase of said beat voltage relative to the anode voltage of the associated electric valve, means comprising a unidirectional conducting device for rectifying said beat voltage to establish a negative unidirectional biasing potential tending to maintain the associated electric valve means, nonconductive, means for producing a voltage sufficient to overcome said biasing potential to render said electric valve means conductive, means responsive to a resultant of said last mentioned voltage and said biasing potential and means for controlling the phase of said resultant to control the moments during cycles of associated anode voltages at which the electric valve means are rendered conductive.

45. In combination, an alternating current circuit, a second alternating current circuit, electric translating apparatus connected between said circuits for effecting transfer of power therebetween and comprising a plurality of electric valve means each having an anode and a control member, and a plurality of excitation circuits each associated with a different one of said electric valve means and including means for producing a periodic voltage which varies in accordance with the voltage of said first mentioned circuit, means for producing a second periodic voltage the frequency of which varies in accordance with a controlling influence derived from said second alternating current circuit, means responsive to said first mentioned and said second periodic voltages for producing a beat voltage of variable magnitude having an envelope which varies in accordance with an electrical condition of said second circuit, means including a rectifier for producing a unidirectional biasing potential which varies in accordance with the envelope of said beat voltage and means for producing a voltage sufficient to overcome said biasing potential to render the associated electric valve means conductive.

46. In combination, an alternating current circuit, a second alternating current circuit, electric translating apparatus connected between said circuits for effecting the transfer of power therebetween and comprising a plurality of electric valve means each having an anode and a control member, and a plurality of excitation circuits each associated with a different one of said electric valve means and including means for producing a periodic voltage which varies in accordance with the voltage of said first mentioned circuit, means for producing a second periodic voltage the frequency of which varies in accordance with a controlling influence derived from said second alternating current circuit means responsive to said first mentioned and said second periodic voltages for producing a beat voltage of variable magnitude having an envelope modulated in accordance with an electrical condition of said second alternating current circuit, said envelope having points of sharp minima, means comprising a rectifier for producing a negative unidirectional biasing potential the magnitude of which varies in accordance with said envelope tending to maintain the associated electric valve means nonconductive and means for producing a voltage sufficient to overcome said biasing potential to render said electric valve means conductive at predetermined times during cycles of anode voltage.

47. In combination, an alternating current circuit, a second alternating current circuit, electric translating apparatus connected between said circuits for effecting the transfer of power therebetween and comprising a plurality of electric valve means each having an anode and a control member, and a plurality of excitation circuits each associated with a different one of said electric valve means and including means for producing a periodic voltage which varies in accordance with the voltage of said first mentioned circuit, means for producing a second periodic voltage the frequency of which varies in accordance with a controlling influence derived from said second alternating current circuit, means responsive to said first mentioned and said second periodic voltages for producing a beat voltage of variable magnitude having an envelope modulated in accordance with the voltage of said second alternating current circuit, said envelope having points of sharp minima, means for producing a negative unidirectional biasing potential which varies in accordance with said envelope comprising a rectifier energized in accordance with the envelope of said beat voltage and a capacitance connected to be energized from said rectifier and means for producing a voltage sufficient to overcome said biasing voltage at the minima values of said envelope to render said electric valve means conductive at predetermined moments during cycles of anode voltage.

48. In combination, an alternating current circuit, a second circuit, electric translating apparatus for transmitting power and comprising a dynamo-electric machine of the induction type having a primary winding connected to said alternating current circuit and having a secondary winding, a plurality of electric valve means connected between said second circuit and said secondary winding and each having an anode and a control member for controlling the conductivity thereof, and an excitation circuit for energizing the control members comprising means for producing a periodic voltage which varies in accordance with an electrical condition of one of said circuits, means for producing a second periodic voltage the frequency of which varies in accordance with a controlling influence derived from the other of said circuits and means responsive to a periodic voltage of beat frequency produced by said periodic voltages for impressing on said control members voltages to render said electric valve means conductive in a predetermined order to effect transmission of power between said machine and said first mentioned circuit.

ERNST F. W. ALEXANDERSON.

CERTIFICATE OF CORRECTION.

Patent No. 2,213,945. September 10, 1940.

ERNST F. W. ALEXANDERSON.

It is hereby certified that error appears in the printed specification of the above numbered patent requiring correction as follows: Page 4, first column, line 9, for the reference numeral " 73" " read --73'--; and second column, line 39, after "circuit" and before the period insert "37"; page 5, second column, line 60, for "is" read --it--; page 6, first column, line 15, for "aleading" read --a leading--; and second column, line 49, for "undertsood" read --understood--; page 8, second column, line 12, for "The" read --In--; page 9, first column, line 41-42, for "excitationo" read --excitation--; and second column, line 1, for "establishd" read --established--; page 10, first column, line 70, claim 3, for "excitattion" read --excitation--; and second column, line 58, claim 8, for "resuultant" read --resultant--; page 11, second column, line 45, claim 20, after "generator" insert a period; page 14, first column, line 1, claim 40, after "means" strike out the comma; line 50, claim 42, for "associted" read --associated--; page 15, first column, line 38, claim 46, after the word "circuit" insert a comma; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.